United States Patent
Dai et al.

(10) Patent No.: US 12,413,966 B2
(45) Date of Patent: Sep. 9, 2025

(54) METHOD, DEVICE, AND SYSTEM FOR PHYSICAL CHANNEL ENCRYPTION IN WIRELESS NETWORKS

(71) Applicant: ZTE Corporation, Shenzhen (CN)

(72) Inventors: Bo Dai, Shenzhen (CN); Jin Xu, Shenzhen (CN); Guanghui Yu, Shenzhen (CN); Feng Xie, Shenzhen (CN); Liujun Hu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 221 days.

(21) Appl. No.: 18/487,436

(22) Filed: Oct. 16, 2023

(65) Prior Publication Data

US 2024/0137758 A1    Apr. 25, 2024

Related U.S. Application Data

(63) Continuation of application No. PCT/CN2021/093809, filed on May 14, 2021.

(51) Int. Cl.
*H04W 12/0431* (2021.01)
*H04W 12/037* (2021.01)

(52) U.S. Cl.
CPC ..... *H04W 12/0431* (2021.01); *H04W 12/037* (2021.01)

(58) Field of Classification Search
CPC .................................................. H04L 9/0852
See application file for complete search history.

(56) References Cited

U.S. PATENT DOCUMENTS 9,749,854 B2 * 8/2017 Jover .................... H04L 9/0819
10,432,399 B2 * 10/2019 Gage ..................... G06F 21/606
(Continued)

FOREIGN PATENT DOCUMENTS

CN    101692731 A    4/2010
CN    102082796 A    6/2011
(Continued)

OTHER PUBLICATIONS

Extended European Search Report issued in European Patent Application No. 21941376.2 dated Nov. 22, 2024, 9 pages.
(Continued)

*Primary Examiner* — Viral S Lakhia
(74) *Attorney, Agent, or Firm* — Crowell & Moring LLC

(57) ABSTRACT

This disclosure above describes a method, a device, and a system for encrypting/decrypting physical channels in a wireless communication network. Among various embodiments are: pre-allocating a key, dynamically granting a key, encrypting the physical channel based on key in various levels, dividing the spectrum into two categories, or dividing a network into an initial access network and a private network. In one embodiment, a method for physical channel encryption is disclosed. Performed by a UE, the method may include obtaining a first key for decrypting a first physical channel, the first physical channel being encrypted; and decrypting the first physical channel based on the first key to obtain a signal or data transmitted by a first network element, the signal or the data being carried in the first physical channel.

14 Claims, 6 Drawing Sheets

(56) References Cited

U.S. PATENT DOCUMENTS

| | | | |
|---|---|---|---|
| 11,743,731 B2* | 8/2023 | Bernsen | H04W 12/02 |
| | | | 726/26 |
| 12,170,972 B2* | 12/2024 | Kolding | H04W 56/0015 |
| 2015/0023503 A1 | 1/2015 | Baek et al. | |
| 2015/0382188 A1 | 12/2015 | Jover | |
| 2019/0007383 A1 | 1/2019 | Vallieres et al. | |
| 2019/0327611 A1* | 10/2019 | Middelesch | H04W 12/033 |
| 2020/0044840 A1 | 2/2020 | Chang | |
| 2021/0297853 A1* | 9/2021 | Lee | H04W 60/04 |
| 2022/0104011 A1* | 3/2022 | Fischer | H04W 12/06 |
| 2022/0191733 A1* | 6/2022 | Ali | H04L 41/0806 |

FOREIGN PATENT DOCUMENTS

| | | |
|---|---|---|
| CN | 102215484 A | 10/2011 |
| CN | 108702353 A | 10/2018 |
| WO | WO 2014/185845 A1 | 11/2014 |
| WO | 2021/064444 A1 | 4/2021 |

OTHER PUBLICATIONS

International Search Report in International Application No. PCT/CN2021/093809 dated Feb. 15, 2022, 3 pages.

\* cited by examiner

METHOD, DEVICE, AND SYSTEM FOR PHYSICAL CHANNEL ENCRYPTION IN WIRELESS NETWORKS

CROSS-REFERENCE TO RELATED APPLICATION

This application is a continuation application of PCT International Patent Application No. PCT/CN2021/093809, filed with the China National Intellectual Property Administration, PRC on May 14, 2021, which is herein incorporated by reference in its entirety.

TECHNICAL FIELD

This disclosure is directed generally to wireless communications, and particularly to methods, systems and devices for encrypting/decrypting physical channels in a wireless communication network.

BACKGROUND

Wireless communication is used for a wide range of applications, including financial related applications (e.g., banking and trading), health monitoring, social networking, and the like. Security is a critical aspect in the design and use of wireless networks. Security has traditionally been implemented at higher, logical layers of communication networks, rather than at the level of the physical channel.

SUMMARY

This disclosure is directed to methods, systems and devices for encrypting/decrypting physical channels in a wireless communication network.

In one embodiment, a method for physical channel encryption in a wireless communication network is disclosed. Performed by a user equipment (UE), the method may include obtaining a first key for decrypting a first physical channel, the first physical channel being encrypted; and decrypting the first physical channel based on the first key to obtain a signal or data transmitted by a first network element, the signal or the data being carried in the first physical channel.

In another embodiment, a method for encrypting a physical channel in a wireless communication network is disclose. Performed by a network element of the wireless communication network, the method may include at least one of: encrypting the physical channel in a bit level based on a key; encrypting the physical channel in a modulated symbol level based on the key; or encrypting the physical channel in a time domain symbol level based on the key.

In yet another embodiment, a method for wireless communication in a wireless communication network is disclosed. The wireless communication network includes a first network and a second network. Perform by a UE, the method may include performing an initial access to the first network via an un-encrypted physical channel; acquiring a key from the first network, the key applying to a physical channel in the second network; and performing a set of operations based on the key in the second network.

In some embodiments, there is a wireless communication device comprising a processor and a memory, wherein the processor is configured to read code from the memory and implement any methods recited in any of the embodiments.

In some embodiments, a computer program product comprising a computer-readable program medium code stored thereupon, the code, when executed by a processor, causing the processor to implement any method recited in any of the embodiments.

The above embodiments and other aspects and alternatives of their implementations are described in greater detail in the drawings, the descriptions, and the claims below.

DETAILED DESCRIPTION

The following description and drawing set forth certain illustrative implementations of the disclosure in detail, which are indicative of several example manners in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings.

Introduction

Figure 1:
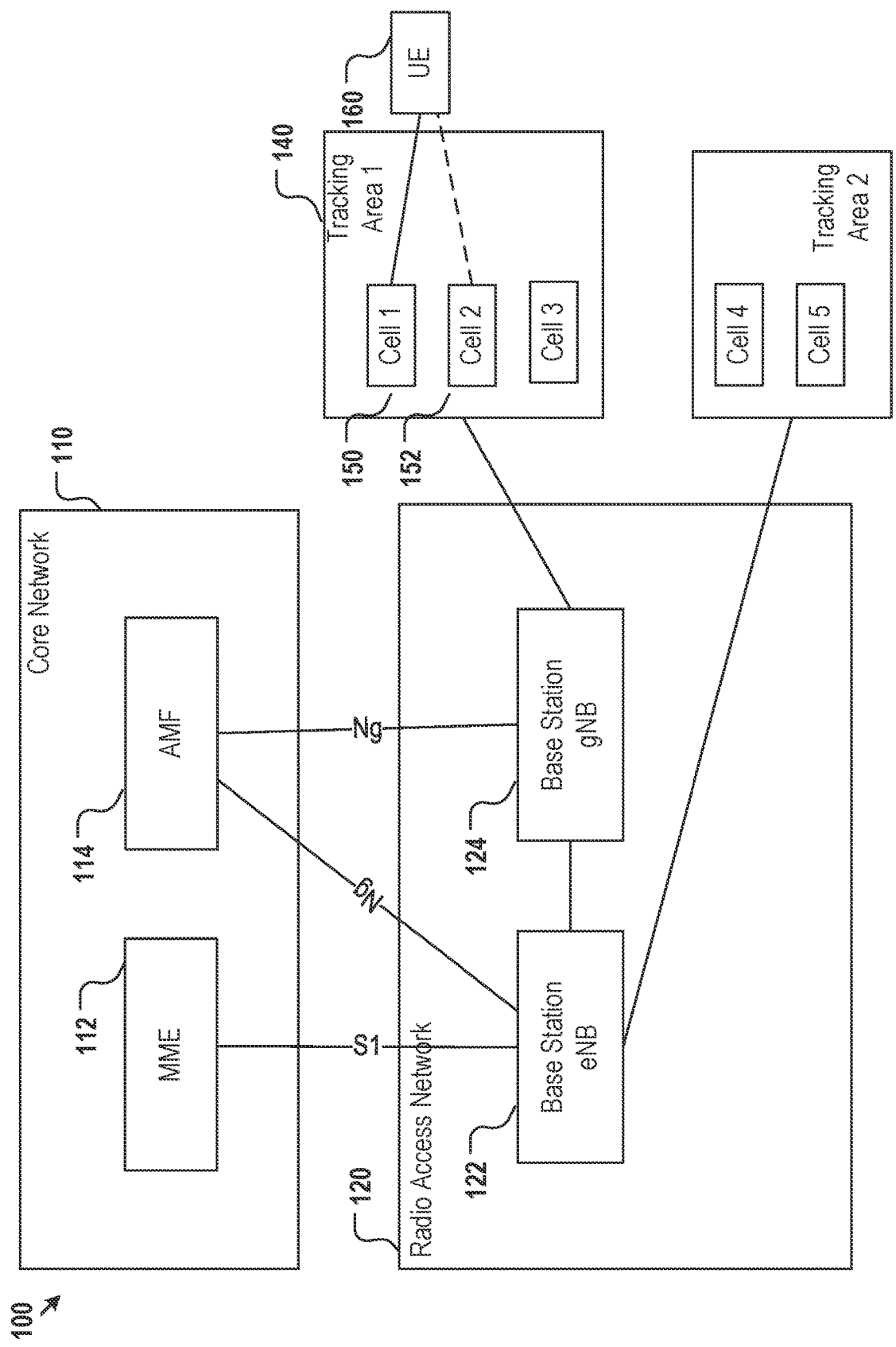
FIG. 1 shows an exemplary wireless communication network.

FIG. 1 shows an exemplary wireless communication network 100 that includes a core network 110 and a radio access network (RAN) 120. The core network 110 further includes at least one Mobility Management Entity (MME) 112 and/or at least one Access and Mobility Management Function (AMF). Other functions that may be included in the core network 110 are not shown in FIG. 1. The RAN 120 further includes multiple base stations, for example, base stations 122 and 124. The base stations may include at least one evolved NodeB (eNB) for 4G LTE, or a Next generation NodeB (gNB) for 5G New Radio (NR), or any other type of signal transmitting/receiving device such as a UMTS NodeB. The eNB 122 communicates with the MME 112 via an S1 interface. Both the eNB 122 and gNB 124 may connect to the AMF 114 via an Ng interface. Each base station manages and supports at least one cell. For example, the base station gNB 124 may be configured to manage and support cell 1, cell 2, and cell 3.

The gNB 124 may include a central unit (CU) and at least one distributed unit (DU). The CU and the DU may be co-located in a same location, or they may be split in different locations. The CU and the DU may be connected via an F1 interface. Alternatively, for an eNB which is capable of connecting to the 5G network, it may also be similarly divided into a CU and at least one DU, referred to as ng-eNB-CU and ng-eNB-DU, respectively. The ng-eNB-CU and the ng-eNB-DU may be connected via a W1 interface.

The wireless communication network 100 may include one or more tracking areas. A tracking area may include a set of cells managed by at least one base station. For example, tracking area 1 labeled as 140 includes cell 1, cell 2, and cell 3, and may further include more cells that may be managed by other base stations and not shown in FIG. 1. The wireless communication network 100 may also include at least one UE 160. The UE may select and access a cell among multiple cells supported by a base station to communication with the base station through Over the Air (OTA) radio communication interface and resource. The OTA interface may include various uplink/downlink physical channels which are used to carry data and/or signal. When the UE 160 travels in the wireless communication network 100, it may reselect a cell for communications. For example, the UE 160 may initially select cell 1 to communicate with base station 124, and it may then reselect cell 2 at certain later time point. The cell selection or reselection by the UE 160 may be based on wireless signal strength/quality in the various cells and other factors.

The wireless communication network 100 may be implemented as, for example, a 2G, 3G, 4G/LTE, 5G cellular communication network, or 6G wireless communication network. Correspondingly, the base stations 122 and 124 may be implemented as a 2G base station, a 3G NodeB, an LTE eNB, a 5G NR gNB, or a 6G NB. The UE 160 may be implemented as mobile or fixed communication devices which are capable of accessing the wireless communication network 100. The UE 160 may include but is not limited to mobile phones, laptop computers, tablets, personal digital assistants, wearable devices, IoT devices, MTC/eMTC devices, distributed remote sensor devices, roadside assistant equipment, and desktop computers.

While the description below focuses on cellular wireless communication systems as shown in FIG. 1, the underlying principles are applicable to other types of wireless communication systems. These other wireless systems may include but are not limited to Wi-Fi, Bluetooth, ZigBee, and WiMax networks.

Physical Channel in Wireless Communication Network

Figure 2:
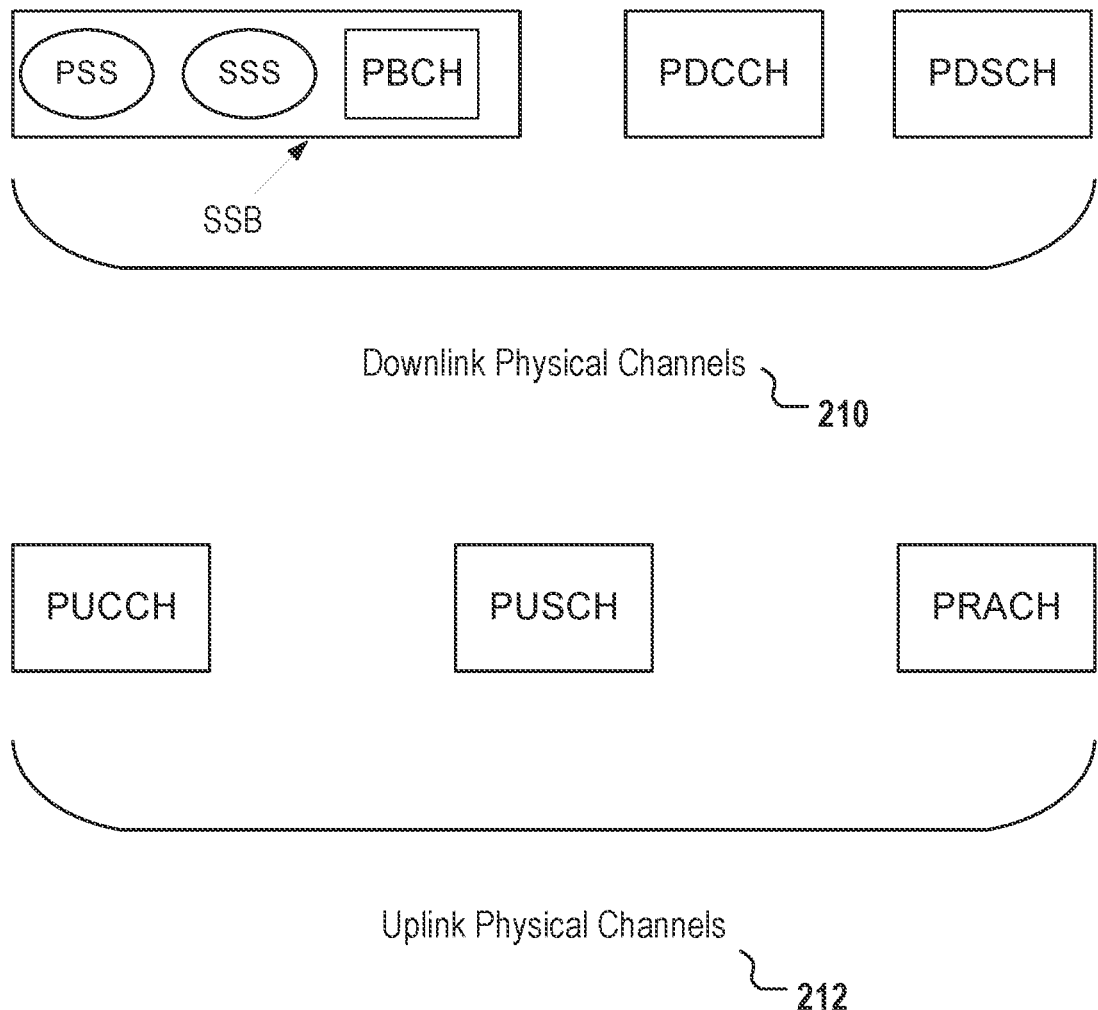
FIG. 2 shows exemplary physical channels in a wireless communication network.

FIG. 2 shows exemplary physical channels in a wireless communication network. The physical channels includes downlink physical channel 210 and uplink physical channel 212 and may carry user data or signaling data.

The downlink physical channel may include Physical Downlink Shared Channel (PDSCH), Physical Downlink Control Channel (PDCCH), and Physical Broadcast Channel (PBCH). In some implementations, a Synchronization Signal Block (SSB) may be formed by the PBCH, a Primary Synchronization Signal (PSS), and a Secondary Synchronization Signal (SSS). In addition to carrying the SSB, the downlink physical channel may also carry a Demodulation Reference Signal (DMRS), a Phase Tracking Reference signal (PT-RS), a Channel State Information Reference Signal (CSI-RS), and the like.

The uplink physical channels include Physical Uplink Shared Channel (PUSCH), Physical Uplink Control Channel (PUCCH), Physical Random Access Channel (PRACH), and the like. The uplink physical channel may carry a DMRS signal, a PT-RS signal, a Sounding Reference Signal (SRS), and the like.

Not shown in FIG. 2, a physical channel occupies a frequency domain resource. The frequency domain resource may be represented by a frequency range, a frequency point, a Bandwidth Part (BWP), one or more physical resource blocks (PRBs), one or more resource blocks (RBs), or the like. The physical channel may also occupy a time domain resource which may be represented by a symbol, a slot, a subframe, a frame, a hyper frame, or the like.

It is to be understood that there may be more types of physical channels in the wireless communication network. The principle for encrypting and decrypting the physical channel described in this disclosure applies to all types of physical channels in a wireless communication network.

Currently, in cellular networks such as 4G LTE network and 5G NR network, the physical channels carrying system messages are scrambled at the bit level through a cell identifier, and the cell identifier is carried through, for example, the primary synchronization channel and the secondary synchronization channel. The primary synchronization channel and the secondary synchronization channel is accessible (or open) to all UEs, with no secret key verification required. Therefore, the system information of the cellular network may be arbitrarily obtained. A malicious UE can use the obtained system information for interfering or attacking the network. With the knowledge of the system information, these interference or attack may be targeted, for example, to a specific spectrum, a specific channel, or a specific reference signal. In this case, it is difficult for the network to locate the problem and find the presence of the malicious UE. This kind of interference or attack affects the overall performance of the entire network and reduces the user experience.

Brief Description of Embodiments

In this disclosure, to at least solve the aforementioned security issue, physical channel encryption and decryption are introduced. Various embodiments are disclosed to describe physical channel encryption/decryption in detail.

In some embodiments, various methods for distributing a key used for physical channel encryption and/or decryption are described. The key may be pre-distributed to the UE, for example, by an operator, or a vertical industry. The key may also be dynamically granted by the network, once the UE is authenticate by the network.

In some embodiments, a UE may first accesses the network via a pre-distributed key and then be granted with another key once the UE is authenticated by the network. The pre-distributed key may be weaker than the granted key.

In some embodiments, spectrums in the wireless network may be categorized, such that physical channels in one spectrum is encrypted and physical channels in another spectrum is not encrypted and open to all UEs. Spectrums may correspond to different security levels and may require corresponding keys to satisfy the security level.

In some embodiments, various methods for encrypting a physical channel is disclosed. The physical channel may be encrypted at different levels including a bit level, a modulated symbol level, or a time domain symbol level. The encryption may be based on a pseudo random sequence which is generated according to an encryption key. An initialization value of the pseudo random sequence may be based on the encryption key. The encryption may include phase rotating based on the pseudo random sequence, or scrambling based on the pseudo random sequence.

In some embodiments, all physical channels are encrypted, whereas in some other embodiments, only a partial of physical channels are encrypted.

In some embodiments, only uplink physical channels or part of uplink physical channels are encrypted.

In some embodiments, only downlink physical channels or part of downlink physical channels are encrypted.

Physical Channel Encryption

In this disclosure, various embodiments are described for encrypting a physical channel. The encryption may be based on an encryption key (or may be referred to as a key, a physical key, a physical secret key). For example, the encryption may be based on a pseudo random sequence which is further based on the encryption key. The corresponding physical channel decryption may be based on a decryption key corresponding to the encryption key. The encryption key and the decryption key have a corresponding relationship and may or may not be the same. In some embodiments, for the purpose of simplification, an encryption key and a decryption key may both be generally referred to as a key. In some embodiments, the key may be represented by or transformed into a binary format which includes n bits, where n is a non-negative integer.

In some embodiments, both the uplink physical channel and the downlink physical channel may be encrypted. In some embodiments, only the downlink physical channel may be encrypted. In some embodiments, only the uplink physical channel may be encrypted.

In some embodiments, all the physical channels may be encrypted. In some embodiments, only partial of the physical channels may be encrypted, and the rest of the physical channels may be open to all the wireless terminals (or UEs).

The encryption may be performed on a bit level. For example, for each bit in a code word. The encryption may also be performed on a modulated symbol level. The encryption may also be performed on a time domain symbol level. More details will be disclosed in later embodiments.

Embodiment 1—Key Distribution

In one implementation, the key includes a pre-distributed (or pre-assigned, pre-allocated) key. The physical channel is encrypted using the pre-distributed key. Only the UE that obtains or is configured with the key may correctly decrypt and decode the physical channel, thereby obtaining the information carried in the physical channel, such as system information or broadcast message. The UE may then connect to the network (or access the network) via a physical channel based on, for example, the system information or the broadcast message. In some embodiments, the wireless communication network may further allocate a specific spectrum and the UE may access (or connect to) the network via a physical channel located in the specific spectrum. This specific spectrum may be referred to as a first category spectrum.

This implementation at least provides a security improvement: a malicious UE which has not obtained the key cannot obtain system messages thus it cannot decrypt and decode the physical channel correctly. Therefore, without knowing the system information for accessing the network, the malicious UE cannot cause disruption or interference to a specific frequency domain or a specific channel. Therefore a targeted network attack by the malicious UE may be avoided.

The pre-distributed key can be pre-distributed by the operator and written into a SIM card of the UE, or it can be distributed by a specific key management node after accessing a specific network through WIFI access or wired access. The specific network may be a standalone network and may or may not be connected to the wireless communication network. The specific network may also be part of the wireless communication network, such as a function node of the wireless communication network. Specifically, the UE may not need to access a base station or a core network of the wireless communication network to gain access to the specific network in order to acquire the key. For example, the specific network may belong to a vertical industry and may include a local area network. Alternatively, the key may be distributed to the UE via a vertical application industry (or vertical industry), such as: an industrial park, or a regional network (e.g., a regional network owned by a factory). In some implementations, the vertical industry and the regional network may be configured with specific rules to allocate and distribute the key to the UE. In some implementations, the key may be distributed to the UE via a specific application (APP) installed on the UE. There may be other ways to pre-distribute the key to the UE which is not limited in this disclosure.

After the key is distributed to the UE, it may be fixed until the next key update via the aforementioned methods, or the key may be dynamically updated following a specific pattern, or be based on a specific indication or a predefined rule. For example, the key may be updated according to a time slot index, a subframe index, a radio frame index, a super frame index, a hyper-frame index, or the like. The predefined rule may be indicated by the network (e.g., via system information or dedicated signaling message such as a radio resource control (RRC) message to the UE), or may be sent to the UE along with the key.

The key may be allocated by a dedicated node, or another node configured with key distribution function. The key may also be allocated by a dedicated security database. Such dedicated node or security database may belong to, for example, a vertical industry, an industrial park, a factory, etc. The key may also be generated and distributed by a base station, or may be allocated by a node in the core network, which may be part of a wireless communication network owned by an operator. There is no limitation imposed in this disclosure on how to distribute the key to the UE.

In one implementation, the key may apply to a specific spectrum (i.e., a frequency spectrum). The spectrum may be pre-defined, or it may be indicated by a certain network node. The spectrum may also be pre-stored in the SIM, or it may be allocated by the vertical application industry which is described above.

In one implementation, the key may apply to (i.e., used for encryption and/or decryption of) all the physical channels. The key may only apply to all or partial of the downlink physical channels. Or the key may only apply to all or partial of the uplink physical channels. Or the key may apply to physical channels that carry specific system messages. These system messages may include a Master Information Block (MIB), or any of the System Information Blocks (SIBs), such as SIB1, SIB2, etc.

Embodiment 2—Key Distribution

Figure 3A:
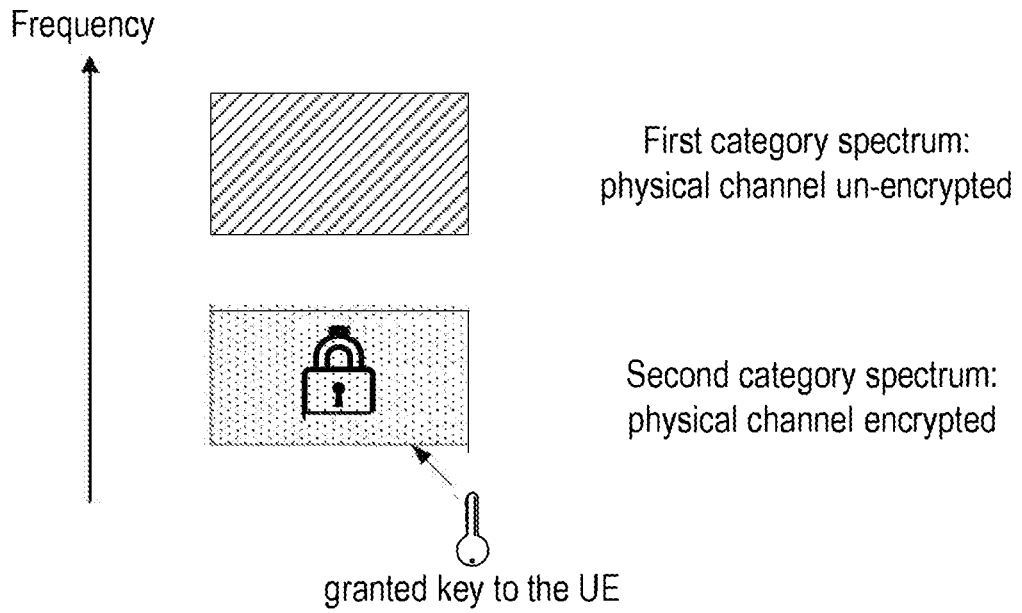
FIG. 3A shows exemplary first category spectrum with un-encrypted physical channel and second category spectrum with encrypted physical channel.

In this embodiment, referring to FIG. 3A, the available spectrum in the wireless communication system may include two categories: a first category spectrum and a second category spectrum.

The physical channel in the first category spectrum is not encrypted. This is the current implementation in 4G LTE system and 5G NR system. The physical channel in the first category spectrum is open to all UEs. A UE may decode the physical channel in the first category spectrum, for example, to obtain system information, without the need of a key for decrypting the physical channel. The UE may then be able to access the network using a frequency domain resource in the first category spectrum, according to the system information. On the other hand, the physical channel in the second category spectrum is encrypted by using a key. The UE may be granted with a key for decrypting the physical channel in the second type of spectrum. Only the UE that obtains the key can correctly decrypt and decode the physical channel in the second category spectrum. In this case, with the granted key, the UE may then obtain the system message carried in the physical channel in the second category spectrum, and access the network using a frequency domain resource in the second category spectrum according to the system message. However, those terminals that are not granted with the key cannot decrypt and decode the physical channel correctly. Therefore, accessing to the network using the second category spectrum is protected with the key.

In one implementation, a key (i.e., a granted key) may be granted and transmitted by the network to the UE after the UE accesses the network on the first category spectrum. In particular, after the UE accesses the network on the first category spectrum, the UE is further authenticated by the network via an authentication procedure. The authentication procedure may involve a base station and/or a core network node of the wireless communication network. Once the UE is authenticated, the wireless communication network transmits the granted key to the UE, for example, the base station transmits the granted key to the UE. The granted key is then used by the UE to decrypt the physical on the second type of spectrum.

In one implementation, the granted key applies to all or just a partial of the physical channels in the second category spectrum. In another implementation, the granted key applies to all the downlink channels or a partial of the downlink channels in the second category spectrum. In yet another implementation, the granted key applies to all the uplink channels or a partial of the uplink channels in the second category spectrum.

The network may indicate to the UE whether the physical channel corresponding to a current cell or a serving of the UE is encrypted with a key. The indication may be carried in a broadcast message (e.g., a MIB message or a SIB message). The network may also indicate to the UE that the UE is required to use the granted key when using the second spectrum. The network may further transmit information about the second category spectrum to the UE. For example, the second category spectrum information may include a list of frequencies, a list of frequency point locations, a frequency range, a list of BWPs, a list of PRBs, or a list of RBs, etc. The network may also indicate a list of neighboring cells of the UE which support or utilize physical channel encryption. The list of neighboring cells may be UE specific or cell specific.

In one implementation, after the granted key is distributed to the UE, it may be fixed until the next key update. For example, the updated key may be granted by the network grants. The update may be periodically, or be triggered by an event. In another implementation, the key may be dynamically updated following a specific pattern, or be based on a specific indication or a predefined rule. For example, the key may be updated according to a time slot index, a subframe index, a radio frame index, a super frame index, a hyperframe index, or the like. The predefined rule may be indicated by the network (e.g., via system information or dedicated signaling message such as an RRC message to the UE), or may be sent to the UE along with the granted key.

The key may be granted by a dedicated node, or another node configured with key distribution function. The key may also be allocated by a dedicated security database. The key may also be generated and distributed by a base station, or may be allocated by a node in the core network. There is no limitation imposed in this disclosure on how to distribute the key to the UE. It is to be understood that the UE may only obtain the granted key after it is authenticated with the wireless communication network.

In one implementation, the division of the whole spectrum into the first category spectrum and the second category spectrum may be based on component carriers for carrier aggregation scenarios, such as: some component carriers correspond to the first category spectrum, and some component carriers correspond to the second category spectrum. The division may also be based on frequency bands, such as: some frequency bands correspond to the first category spectrum, and some frequency bands correspond to the second category of spectrum. The division may also be based on Bandwidth part (BWP), Physical Resource Block (PRB), or Resource Block (RB). The manner of the division is not limited in this disclosure.

In one implementation, the granted key may apply to (i.e., used for encryption and/or decryption of) all the physical channels. Or the granted key may only apply to all or partial of the downlink physical channels. Or the granted key may only apply to all or partial of the uplink physical channels. Or the granted key may apply to physical channels that carry specific system messages. These system messages may include a Master Information Block (MIB), or any of the System Information Blocks (SIBs), such as SIB1, SIB2, etc.

Figure 4:
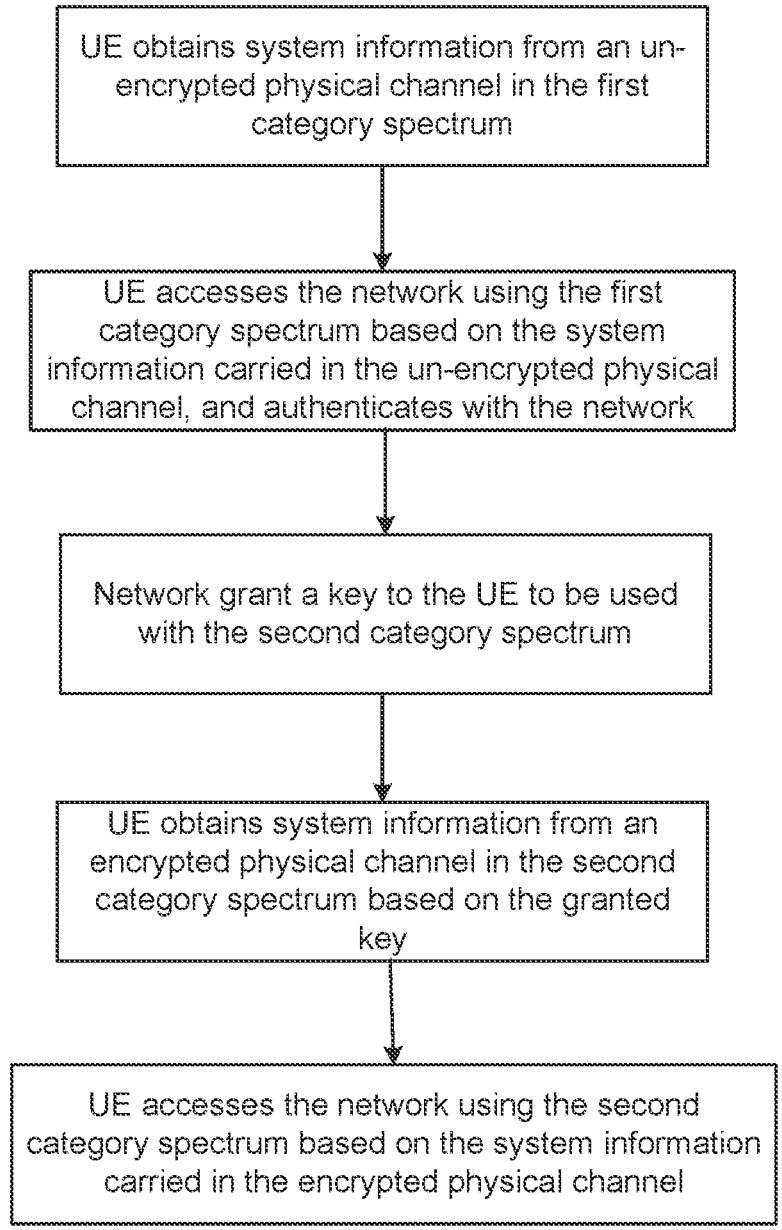
FIG. 4 shows an exemplary key distribution mechanism.

The steps in this embodiment are summarized in FIG. 4. These steps are for example purpose only. In this embodiment, the spectrum in the wireless communication system is divided into two categories. The first category spectrum is open to all the UEs. The second category spectrum has more strict access requirement. Specifically, a UE needs to first access the network based on system information obtained from a physical channel in the first category spectrum and gets authenticated with the network. Once authenticated, the network may grant a key to the UE for decrypting a physical channel in the second category spectrum. A malicious UE, on the other hand, may not be authenticated by the network and thus may not be able to decrypt the physical channel in the second category spectrum. The malicious UE is thus prevented from obtaining the system information transmitted in the physical channel in the second category spectrum. Therefore, the malicious UE cannot cause disruption or interference to a specific frequency domain or a specific channel, and a targeted network attack by the malicious UE may be avoided.

Embodiment 3—Key Distribution

Figure 3B:
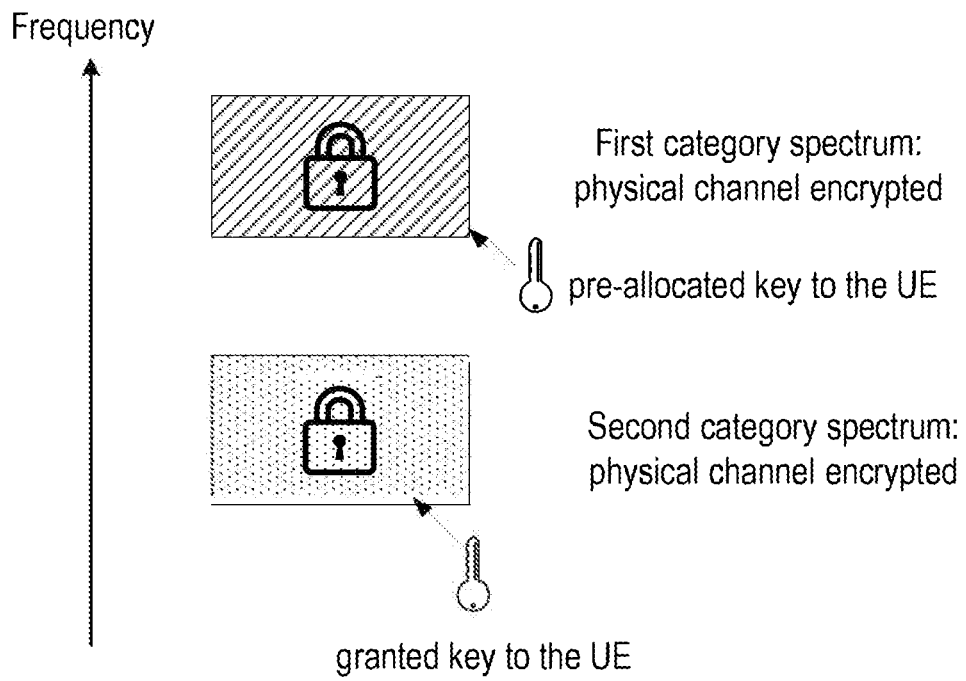
FIG. 3B shows exemplary first category spectrum and second category spectrum with encrypted physical channel.

In this embodiment, referring to FIG. 3B, the available spectrum in the wireless communication system may include two categories: a first category spectrum and a second category spectrum. A pre-distributed key applying to the first category spectrum, and a granted key applying to the second category spectrum are introduced in this embodiment.

As illustrated in FIG. 3B, this embodiment is similar to embodiment 2 which is described above, with the exception that a physical channel in the first category spectrum is also encrypted. The network (or a network element such as a base station) encrypts the physical channel with a key which is pre-distributed to the UE. Only the UE that obtains the pre-distributed key can correctly decrypt and decode the physical channel in the first category spectrum, for example, to obtain system information. The UE may then be able to access the network using a frequency domain resource in the first category spectrum, according to the system information.

In one implementation, within the first category spectrum, all physical channels may be encrypted. In one implementation, within the first category spectrum, only a partial of physical channels may be encrypted.

In one implementation, within the first category spectrum, the physical channel carrying system information may be encrypted. In one implementation, within the first category spectrum, the physical channel carrying system information may be open (i.e., not encrypted).

In one implementation, another key may be granted (referred to as a granted key) and transmitted by the network to the UE after the UE accesses the network on the first category spectrum. For example, after the UE accesses the network on the first category spectrum, the UE may be further authenticated by the network via an authentication procedure. The authentication procedure may involve a base station and/or a core network node of the wireless communication network. Once the UE is authenticated, the wireless communication network transmits the granted key to the UE, for example, the base station transmits the granted key to the UE. The granted key is then used by the UE to decrypt the physical on the second category spectrum.

In one implementation, the UE does not need to be authenticated in order to obtain the granted key. In some embodiments, UE access to the network via the second category spectrum may be based on the system information obtained via the first category spectrum.

In one implementation, UE access to the network via the first category spectrum and the second category spectrum may be independent to each other.

Figure 5:
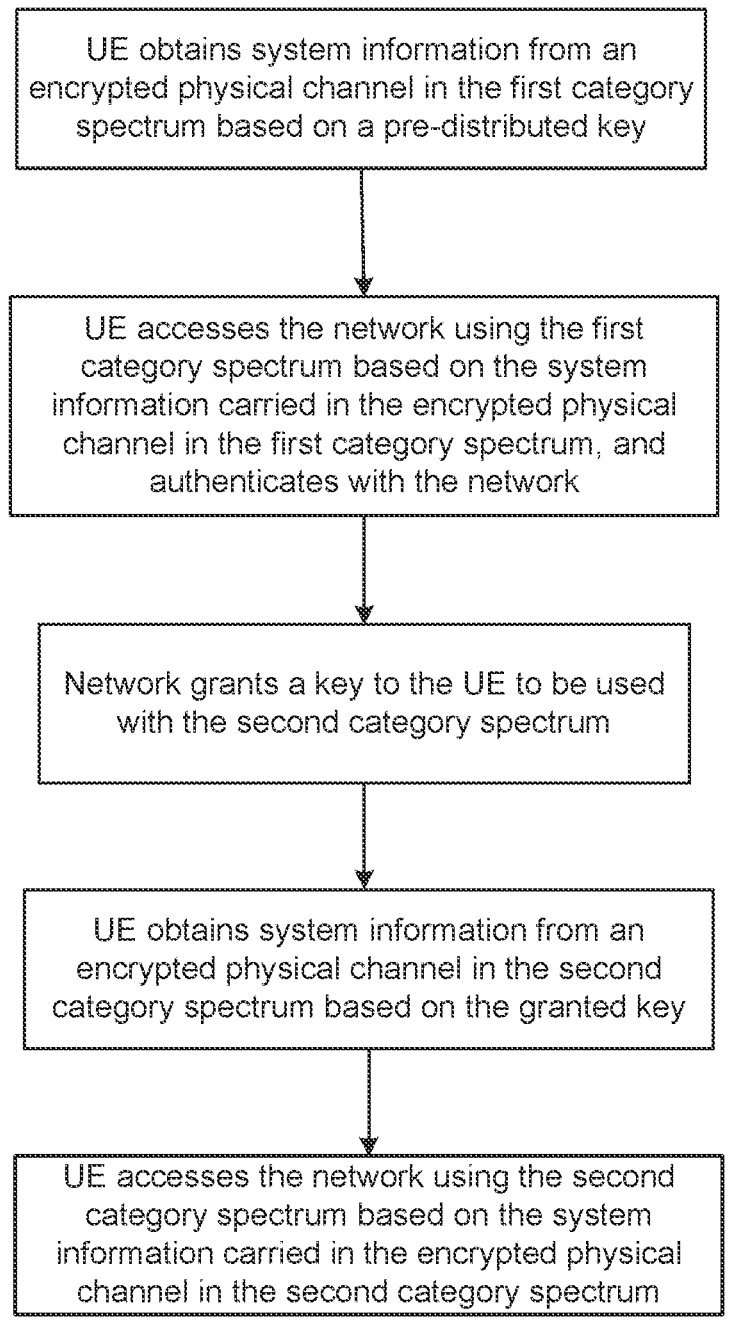
FIG. 5 shows another exemplary key distribution mechanism.

The steps in this embodiment are summarized in FIG. 5. These steps are for example purpose only. In this embodiment, except the UE needs to access the physical channel in the first category spectrum with a pre-distributed key, all the other underlying principles, such as how the granted key is distributed to the UE, how the granted key is updated, and how the spectrum is divided, are similar to embodiment 2 and are not described in detail herein.

Embodiment 4—SSB Based Key Acquisition

In the wireless communication network, a base station may transmit a sequence of SSB beams with different directions and UE detects the best beam among them, for example, based on a received signal quality. Each UE may be configured, or associated with an SSB in the best beam (or associated with the best beam). In some implementations, the SSB in different beam direction may be assigned with a different SSB index and the UE monitors the SSB based on the SSB index. As the SSB is carried in the physical channel, there is a mapping between the SSB and the physical channel carrying the SSB. That is, a SSB corresponds to a physical channel.

Each SSB has a channel state information. In this embodiment, a UE may obtain a key corresponding to the SSB that the UE monitors (or the UE is associated with), based on the channel state information of the SSB. The UE may then use the key to decrypt the physical channel corresponds to the SSB. The physical channel corresponds to the SSB may include: a PDSCH, a PDCCH, a PDSCH carrying System Information, or a PDSCH carrying a Random Access Response message or a Msg4. The Msg 4 is a message used during a random access procedure.

The UE obtains the physical key corresponding to the SSB based on the channel state information of the SSB associated with the UE. Specifically, the UE determines the downlink beam direction based on the channel state information of the SSB, and generates the key according to the beam direction. The UE may also determine the channel quality based on the channel state information of the SSB, and generates the key according to the channel quality. In one implementation, the channel quality may be a channel quality corresponding to the SSB, or corresponding to the frequency domain where the SSB is located. The UE may generate the key according to a combination of the downlink beam direction and the channel quality.

Accordingly, from a base station perspective, the base station may determine the key according to the downlink beam direction of the SSB associated with a particular UE and/or the channel quality, and use the key to encrypt the physical channel, and transmits the physical channel (i.e., the data/signal in the physical channel).

The method of determining the key according to the beam direction and/or the channel quality may include: pre-configure a one-to-one mapping relationship between the beam direction (and/or the channel quality) and the key, and select the corresponding key according to the mapping relationship.

In one implementation, an SSB may be configured, for example, by a base station, to include information of the key, or indicate the key. Upon detecting or receiving the SSB, the UE may derive or generate the key according to the SSB.

The beam direction may include a precoding index, an SSB index, a beam angle index, a beam index, or a spatial identification index such as a spatial vector index.

Example 1

Beam direction 1–N corresponds to key 1–N, respectively, where N is the total number of keys or the maximum number of beams.

Example 2

The channel quality value (such as Reference Signal Received Power (RSRP) value or Signal to Noise Ratio (SNR) value) is divided into G intervals (or ranges), and each interval corresponds to a key.

Channel quality value interval 1–N corresponds to physical key 0–N, respectively, where N is the total number of keys or the maximum number of channel quality value intervals.

Example 3

Each channel quality value (such as RSRP value) interval corresponds to a key set; each key set corresponds to G beam directions, and each beam direction corresponds to a key in the physical key set.

The base station may first determine the channel quality interval based on the channel quality value, then determine the physical key set index according to the channel quality interval, and select the corresponding physical key from the physical key set according to the beam direction.

Example 4

Each beam direction corresponds to a physical key set; each channel quality value (such as RSRP value) interval corresponds to a physical key in the physical key set.

The base station may first determine the physical key set according to the beam direction, the determine the channel quality interval according to the channel quality value, and select the corresponding physical key from the physical key set based on the channel quality interval.

Embodiment 5—Physical Channel Encryption

In this embodiment, various methods for encrypting the physical channel are disclosed.

The physical channel may be encrypted based on a key in various levels include: a bit level, a modulated symbol level, or a time domain symbol level. For example, the encryption may include a manner of scrambling, or phase rotating based on the key. Other encryption method based on the key may also be chosen to encrypt the physical channel.

Method 1: Bit Level Scrambling

Each code word q includes a bit sequence $b^{(q)}(0), \ldots, b^{(q)}(M_{bit}^{(q)}-1)$ ($M_{bit}^{(q)}$ is the number of bits in a code word to be transmitted in a subframe). Before the code word is modulated, the bit sequence may be scrambled, to generate a scrambled bit sequence $\tilde{b}^{(q)}(0), \ldots, \tilde{b}^{(q)}(M_{bit}^{(q)}-1)$. The scramble may be based on the equation below:

$$\tilde{b}^q(i) = (b^q(i) + c^q(i)) \bmod 2$$

Where $c^q(i)$ is a pseudo random sequence and is generated base on the key, which will be described in detail below, and i is the bit index of the bit sequence.

Method 2: Modulated Symbol Level Encryption

Assuming after the modulation, the modulated symbol is d(i), then the physical channel encryption may be performed by conducting phase rotating on the modulate symbol based on the equation below:

$$x(i) = d(i) \cdot e^{2\pi \frac{f(i)}{N1}}$$

where:

$$f(i) = \sum_{t=0}^{L3} 2^t \cdot c(2^{L3} \cdot i + t) \bmod N1$$

N1 and L3 are predefined integers, and $2^{L3} \geq N1$. In some implementations, L3 is the smallest integer that satisfies $2^{L3} \geq N1$. For example, N1=6, and L3=3.

Method 3: Time Domain Symbol Level Encryption

Assuming the time domain symbol is h(i), then the physical channel encryption may be performed by conducting phase rotating on the time domain symbol based on the equation below:

$$y(i) = h(i) \cdot e^{2\pi \frac{f(i)}{N1}}$$

where:

$$f(i) = \sum_{t=0}^{L3} 2^t \cdot c(2^{L3} \cdot i + t) \bmod N1$$

N1 and L3 are predefined integers, and $2^{L3} \geq N1$. In some implementation, L3 is the smallest integer that satisfies $2^{L3} \geq N1$. For example, N1=6, and L3=3.

Pseudo Random Sequence Generation

The pseudo random sequence c (may also be denoted as c(i), i being the index) in the above methods may be generated by initializing the sequence using an initial value $c_{init}$ based on one of the following formulas:

$c_{init} = n_{PHID} \cdot 2^{L1+L2} + \text{SlotIndex} \cdot 2^{L1} + n_{ID}$;

$c_{init} = n_{PHID} \cdot 2^{L1+L2+1} + q \cdot 2^{L1+L2} + \text{SlotIndex} \cdot 2^{L1} + n_{ID}$;

$c_{init} = n_{PHID} \cdot 2^{L1+1} + q \cdot 2^{L1} + n_{ID}$;

$c_{init} = \text{SlotIndex} \cdot 2^w + n_{PHID}$;

$c_{init} = \text{SFNIndex} \cdot 2^{w+L2} + \text{SlotIndex} \cdot 2^w + n_{PHID}$; or $c_{init} = n_{PHID}$.

Where:

$n_{PHID}$ is the key used for encrypting the physical channel, w is the length of the key. In some implementations, w may be set to one of: 16, 31, 32, 61, 64, or 91;

SlotIndex is the slot index;

SFNIndex is the system frame index;

$n_{ID}$ is a cell ID of a cell associated with the physical channel, or a multicast ID, or an ID configured by the network, the range of $n_{ID}$ may be from 0 to $2^{L1}-1$;

L1 is the bit length of $n_{ID}$ represented in binary format; and

L2 is the bit length of the slot index represent in binary format.

In some implementations, a subframe may transmit up to two code words, that is, $q \in \{0,1\}$. If there is only one code word needs to be transmitted in the subframe, then q=0. The same principle can also apply to subframe transmitting more than two code words.

The scrambling sequence c(i), or $c^q(i)$ includes a pseudo random sequence and may be based on a Gold sequence with a length of L. An output sequence c(n) with a length of $M_{PN}$ (n=0,1, ..., $M_{PN}-1$) may be defined by:

$$c(n) = (x_1(n+N_C) + x_2(n+N_C)) \bmod 2$$

$$x_1(n+L) = (x_1(n+3) + (n)) \bmod 2$$

$$x_2(n+L) = (x_2(n+3) + x_2(n+2) + x_2(n+1) + x_2(n)) \bmod 2$$

Where:

$N_C$ is a non-negative integer, in some implementations, $N_C=1600$;

L is a prime number or an odd number, in some implementations, L may be set to 31, 61, or 91. In some implementations, L may be a positive integer.

The first m sequence $x_1$ may be initialize to: $x_1(0)=1$, $x_1(n)=0$, n=1, 2, ..., L-1;

The second m sequence $x_2$ may be initialize with an initial value $c_{init} = \sum_{i=0}^{L-1} x_2(i) \cdot 2^i$, where $c_{init}$ is define above.

In some embodiments, the scrambling sequence may be based on an M sequence.

In some embodiments, the scrambling sequence may include a Gold sequence, an M sequence, or the like.

The encryption schemes represented in the various equations and formulas in this embodiment are merely examples and the underlying principles for encryption using the key can be expanded to other schemes.

Embodiment 6

Figure 6:
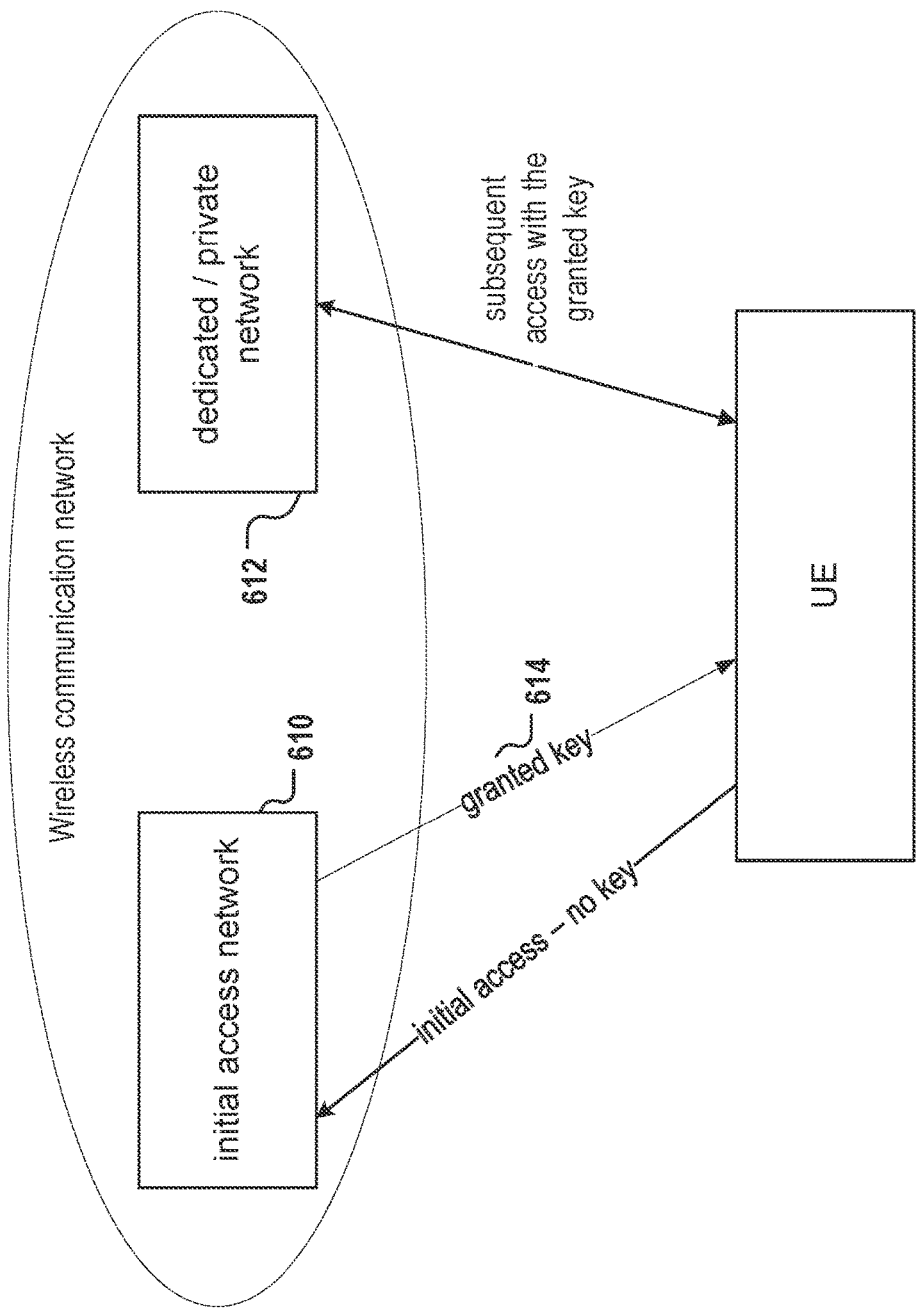
FIG. 6 shows an exemplary wireless communication network including an initial access network and a dedicated network.

Referring to FIG. 6, in some embodiments, the wireless network may be divided into two networks, with one serving as the UE's initial access network 610 and the other serving as the UE's private network (or dedicated network) 612. The UE receives or detects physical channels which are not encrypted in the initial access network. Correspondingly, the network transmits data/signal in physical channels without encryption to the UE that initially accesses the network.

Once the UE is connected to the network after the initial access, the network transmits the granted key 614 to the UE. When the UE subsequently detects paging in the private network and/or accesses the private network, signal/data in the physical channel is encrypted. Therefore, the UE needs to use the granted key 614 to receive or detect or decode the physical channel. Correspondingly, when the network transmits data/signal in physical channel to the UE that has been connected to the network, it encrypts the physical channel with the granted key 614.

In some embodiments, the initial access network 610 may be owned by the operator and may be open to all the UEs. The dedicated network 612 may be owned by a vertical industry or a third party which has its own and more strict security requirement. The dedicated network is protected by the key in the physical channel level. The initial access network 610 and the dedicated network 612 may each being assigned to a specific spectrum.

In some embodiments, a UE may perform different tasks or procedures in different networks, for example, based on a security requirement. The UE may perform security essential tasks in the dedicated network and security non-essential tasks in the initial access network.

In some embodiments, the initial access network 610 may also be encrypted and a UE may acquire a key based on the key distribution methods described in related embodiments in this disclosure. In some embodiments, the dedicate network 612 may use a key which is stronger than the key used in access network 610.

In some embodiments, the UE may perform a predefined and configurable set of operations via the private network based on the granted key 614. For example, these operations may include receiving data from a downlink physical channel, transmitting data via an uplink channel, or an operation associated with obtaining system information. There is no limitation imposed on the operations in this disclosure.

The description and examples in this disclosure are made from the network (e.g., the wireless communication network including a base station, a core network, etc.) perspective, or from the UE perspective. It is to be understood that the network and the UE operate in a coordinated manner. The principle applies to the network side also applies to the UE side. For example, when the network transmits encrypted signal to the UE, the underlying principle for decrypting the signal applies on the UE side. For another example, when the network encrypts a physical signal based on a key or an algorithm, the UE decrypts the physical signal based on a corresponding key or a corresponding algorithm.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution may be practiced without one or more of the specific features or advantages of a particular embodiment. In other instances, additional features and advantages may be recognized in certain embodiments that may not be present in all embodiments of the present solution.

What is claimed is:

1. A method for physical channel encryption in a wireless communication network, performed by a user equipment (UE), the method comprising:

obtaining a first key for decrypting a first physical channel, wherein the first physical channel being is encrypted in a time domain symbol level using following steps:

generating an initial value $c_{init}$ based on the first key using one of following formulas:

$$c_{init} = n_{PHID} \cdot 2^{L1+L2} + \text{SlotIndex} \cdot 2^{L1} + n_{ID};$$

$$c_{init} = n_{PHID} \cdot 2^{L1+L2+1} + q \cdot 2^{L1+L2} + \text{SlotIndex} \cdot 2^{L1} + n_{ID};$$

$$c_{init} = n_{PHID} \cdot 2^{L1+1} + q \cdot 2^{L1} + n_{ID};$$

$$c_{init} = \text{SlotIndex} \cdot 2^{w} + n_{PHID};$$

$c_{init}$=SFNIndex·$2^{w+L2}$+Slot Index·$2^w$+$n_{PHID}$; or $c_{init}$=$n_{PHID}$;

wherein:
  $n_{PHID}$ is the first key, w is a length of the first key;
  SlotIndex is a slot index;
  SFNIndex is a system frame index;
  $n_{ID}$ is a cell ID of a cell associated with the physical channel, or a multicast ID, or an ID configured by the network, a range of $n_{ID}$ being from 0 to $2^{L1}$−1;
  L1 is a bit length of $n_{ID}$ represented in binary format;
  L2 is a bit length of the slot index represent in binary format;
  generating a pseudo random sequence based on the initial value $c_{init}$;
  performing a phase rotation on a time domain symbol associated with the first physical channel according to the pseudo random sequence; and
  decrypting the first physical channel based on the first key to obtain a signal or data transmitted by a first network element, the signal or the data being carried in the first physical channel.

2. The method of claim 1, wherein obtaining the first key comprises one of:
  obtaining the first key from a subscriber identification module (SIM) of the UE;
  obtaining the first key using an application (APP) installed on the UE;
  obtaining the first key from a network node configured to provide a key management function, wherein the UE accesses the network node via one of: a WIFI network, a wireline network, or an access method which is not based on cellular signal; or
  obtaining the first key from or based on a vertical industry that the UE has a subscription.

3. The method of claim 1, wherein obtaining the first key comprises obtaining the first key from one of:
  a base station of the wireless communication network;
  a core network element of the wireless communication network; or
  a security node.

4. The method of claim 1, further comprising:
  updating the first key following a predetermined rule and based on at least one of following indexes determined by the UE:
    a time slot index;
    a sub-frame index;
    a frame index; or
    a hyper frame index.

5. The method of claim 1, wherein:
  the first key applies to a spectrum and the physical channel is in the spectrum; and
  the spectrum is predefined or indicated by one of:
    a SIM of the UE, the SIM storing spectrum information;
    a second network element of the wireless communication network; or
    a vertical industry.

6. The method of claim 1, wherein:
  the wireless communication network comprises a first category spectrum and a second category spectrum, the first category spectrum comprising a second physical channel, the second physical channel being un-encrypted, and the second category spectrum comprising the first physical channel, wherein the first category spectrum and the second category spectrum are categorized based on at least one of: a frequency band; a component carrier; a Band Width Part (BWP); o a Resource Block (RB); and
  obtaining the first key comprises:
    accessing the wireless communication network via the second physical channel; and
    obtaining the first key granted from the wireless communication network.

7. The method of claim 6, wherein the first key applies to at least one physical channel transmitted in the second category spectrum.

8. The method of claim 6, wherein before decrypting the first physical channel based on the first key to obtain the signal or the data transmitted by the first network element, the method further comprises:
  receiving a first message from the wireless communication network, the first message indicating whether the wireless communication network is configured to grant the first key, wherein the first message comprises a broadcast message or a dedicated message; and
  determining whether the wireless communication network is configured to grant the first key according to the first message.

9. The method of claim 6, wherein the first physical channel comprises one of:
  any one of physical channels allocated in the second category spectrum;
  any one of downlink physical channels allocated in the second category spectrum;
  one of a partial of downlink physical channels allocated in the second category spectrum; or
  a physical channel carrying a predetermined system information, the predetermined system information comprising at least one of a Master Information Block (MIB) or a System Information Block (SIB).

10. The method of claim 1, wherein:
  the wireless communication network comprises a first category spectrum and a second category spectrum, the first category spectrum comprising a second physical channel, the second physical channel being encrypted, and the second category spectrum comprising the first physical channel; and
  obtaining the first key comprises:
    decrypting the second physical channel based on a second key which is pre-assigned to the UE;
    accessing the wireless communication network based on system information carried in the first category spectrum, wherein the system information is decrypted based on the second key; and
    obtaining the first key granted from the wireless communication network.

11. The method of claim 1, wherein obtaining the first key comprises one of:
  determining a beam direction based on a channel state information of a Synchronization Signal Block (SSB), and generating the first key based on the beam direction;
  determining a channel quality corresponding to the SSB based on the channel state information of the SSB, and generating the first key based on the channel quality; or
  determining the beam direction and the channel quality corresponding to the SSB based on the channel state information, and generating the first key based on the beam direction and the channel quality,
  wherein the beam direction corresponds to one of:
    an SSB index;
    an angle index;

a beam index; or a space vector index.

12. A method for encrypting a physical channel in a wireless communication network, performed by a network element of the wireless communication network, the method comprising at least one of:

encrypting the physical channel in a bit level based on a key;

encrypting the physical channel in a modulated symbol level based on the key; or encrypting the physical channel in a time domain symbol level based on the key;

generating an initial value $c_{init}$ based on a key using one of following formulas:

$c_{init}=n_{PHID}\cdot 2^{L1+L2}+\text{SlotIndex}\cdot 2^{L1}+n_{ID}$;

$c_{init}=n_{PHID}\cdot 2^{L1+L2+1}+q\cdot 2^{L1+L2}+\text{SlotIndex}\cdot 2^{L1}+n_{ID}$;

$c_{init}=n_{PHID}\cdot 2^{L1+1}+q\cdot 2^{L1}+n_{ID}$;

$c_{init}=\text{SlotIndex}\cdot 2^{w}+n_{PHID}$;

$c_{init}=\text{SFNIndex}\cdot 2^{w+L2}+\text{Slot Index}\cdot 2^{w}+n_{PHID}$; or $c_{init}=n_{PHID}$;

wherein:

$n_{PHID}$ is the key, w is a length of the key;

SlotIndex is a slot index;

SFNIndex is a system frame index;

$n_{ID}$ is a cell ID of a cell associated with the physical channel, or a multicast ID, or an ID configured by the network, a range of $n_{ID}$ being from 0 to $2^{L1}-1$;

L1 is a bit length of $n_{ID}$ represented in binary format;

L2 is a bit length of the slot index represent in binary format; and generating the pseudo random sequence based on the initial value $c_{init}$, and performing a phase rotation on a time domain symbol associated with the physical channel according to the pseudo random sequence.

13. A wireless device comprising a memory for storing computer instructions and a processor in communication with the memory, wherein, when the processor executes the computer instructions, the processor is configured to cause the wireless device to:

obtain a first key for decrypting a first physical channel, wherein the first physical channel being is encrypted in a time domain symbol level using following steps:

generating an initial value $c_{init}$ based on the first key using one of following formulas:

$c_{init}=n_{PHID}\cdot 2^{L1+L2}+\text{SlotIndex}\cdot 2^{L1}+n_{ID}$;

$c_{init}=n_{PHID}\cdot 2^{L1+L2+1}+q\cdot 2^{L1+L2}+\text{SlotIndex}\cdot 2^{L1}+n_{ID}$;

$c_{init}=n_{PHID}\cdot 2^{L1+1}+q\cdot 2^{L1}+n_{ID}$;

$c_{init}=\text{SlotIndex}\cdot 2^{w}+n_{PHID}$;

$c_{init}=\text{SFNIndex}\cdot 2^{w+L2}+\text{Slot Index}\cdot 2^{w}+n_{PHID}$; or $c_{init}=n_{PHID}$;

wherein:

$n_{PHID}$ is the first key, w is a length of the first key;

SlotIndex is a slot index;

SFNIndex is a system frame index;

$n_{ID}$ is a cell ID of a cell associated with the physical channel, or a multicast ID, or an ID configured by the network, a range of np being from 0 to $2^{L1}-1$;

L1 is a bit length of $n_{ID}$ represented in binary format;

L2 is a bit length of the slot index represent in binary format;

generating a pseudo random sequence based on the initial value $c_{init}$;

performing a phase rotation on a time domain symbol associated with the first physical channel according to the pseudo random sequence; and decrypt the first physical channel based on the first key to obtain a signal or data transmitted by a first network element, the signal or the data being carried in the first physical channel.

14. A device comprising a memory for storing computer instructions and a processor in communication with the memory, wherein the processor, when executing the computer instructions, is configured to implement a method of claim 12.

* * * * *